United States Patent
Rofougaran (10) Patent No.: US 8,660,104 B2
(45) Date of Patent: Feb. 25, 2014

(54) METHOD AND SYSTEM FOR COMMUNICATING INFORMATION IN A MULTI-ANTENNA SYSTEM

(75) Inventor: Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1588 days.

(21) Appl. No.: 11/536,672

(22) Filed: Sep. 29, 2006

(65) Prior Publication Data

US 2008/0080454 A1     Apr. 3, 2008

(51) Int. Cl.
| | |
|---|---|
| H04H 20/67 | (2008.01) |
| H04B 7/00 | (2006.01) |
| H04W 4/00 | (2009.01) |
| H04B 7/08 | (2006.01) |
| H04M 1/00 | (2006.01) |

(52) U.S. Cl.
USPC ........ 370/339; 455/553.1; 455/132; 370/310; 370/328

(58) Field of Classification Search
USPC ......... 370/310, 328, 329, 330, 339, 342–350; 455/132, 141, 552.1–553.1, 455/556.1–556.2
See application file for complete search history.

(56) References Cited

U.S. PATENT DOCUMENTS

| | | | | |
|---|---|---|---|---|
| 5,668,837 | A * | 9/1997 | Dent | 375/316 |
| 6,091,715 | A * | 7/2000 | Vucetic et al. | 370/277 |
| 6,952,594 | B2 * | 10/2005 | Hendin | 455/552.1 |
| 6,954,614 | B2 * | 10/2005 | Jespersen | 455/13.3 |
| 7,672,689 | B2 * | 3/2010 | Khlat et al. | 455/552.1 |
| 8,019,303 | B2 * | 9/2011 | Liu et al. | 455/277.1 |
| 8,331,425 | B2 * | 12/2012 | Nicolas et al. | 375/219 |
| 2002/0011955 | A1 * | 1/2002 | Apostolos | 343/700 MS |
| 2002/0054627 | A1 * | 5/2002 | Asikainen | 375/219 |
| 2002/0126770 | A1 * | 9/2002 | Pourseyed et al. | 375/324 |
| 2003/0193923 | A1 * | 10/2003 | Abdelgany et al. | 370/342 |
| 2004/0131014 | A1 * | 7/2004 | Thompson et al. | 370/230 |
| 2005/0096058 | A1 | 5/2005 | Warner | |
| 2005/0119025 | A1 * | 6/2005 | Mohindra et al. | 455/552.1 |
| 2005/0170839 | A1 * | 8/2005 | Rinne et al. | 455/446 |
| 2005/0181752 | A1 | 8/2005 | Sahota | |
| 2006/0072646 | A1 * | 4/2006 | Feher | 375/130 |
| 2006/0133551 | A1 * | 6/2006 | Davidoff et al. | 375/350 |
| 2007/0032266 | A1 * | 2/2007 | Feher | 455/553.1 |
| 2010/0149040 | A1 * | 6/2010 | Ruelke et al. | 342/386 |
| 2010/0150209 | A1 * | 6/2010 | Gonzalez et al. | 375/139 |
| 2010/0151886 | A1 * | 6/2010 | Swope et al. | 455/456.5 |
| 2011/0130092 | A1 * | 6/2011 | Yun et al. | 455/39 |

FOREIGN PATENT DOCUMENTS

KR     20060080270     7/2006

* cited by examiner

*Primary Examiner* — Matthew Sams
(74) *Attorney, Agent, or Firm* — Farjami & Farjami LLP (57) ABSTRACT

Certain aspects of a method and system for communicating information in a multi-antenna system are disclosed. Aspects of one method may include receiving at least one narrowband RF signal via at least one of a plurality of receiving antennas that is unused within a wideband diversity radio frequency (RF) receiver comprising a plurality of receiving antennas, when the wideband diversity RF receiver is operating in a narrowband receiving mode.

21 Claims, 6 Drawing Sheets

METHOD AND SYSTEM FOR COMMUNICATING INFORMATION IN A MULTI-ANTENNA SYSTEM

CROSS-REFERENCE TO RELATED APPLICATIONS/INCORPORATION BY REFERENCE

This application makes reference to:
U.S. application Ser. No. 11/536,678, filed Sep. 29, 2006;
U.S. application Ser. No. 11/536,682, filed Sep. 29, 2006;
U.S. application Ser. No. 11/536,650, filed Sep. 29, 2006;
U.S. application Ser. No. 11/536,644, filed Sep. 29, 2006;
U.S. application Ser. No. 11/536,676, filed Sep. 29, 2006;
U.S. application Ser. No. 11/536,659, filed Sep. 29, 2006;
U.S. application Ser. No. 11/536,673, filed Sep. 29, 2006;
U.S. application Ser. No. 11/536,679, filed Sep. 29, 2006;
U.S. application Ser. No. 11/536,670, filed Sep. 29, 2006;
U.S. application Ser. No. 11/536,648, filed Sep. 29, 2006;
U.S. application Ser. No. 11/536,669, filed Sep. 29, 2006;
U.S. application Ser. No. 11/536,666, filed Sep. 29, 2006;
U.S. application Ser. No. 11/536,675, filed Sep. 29, 2006;
U.S. application Ser. No. 11/536,685, filed Sep. 29, 2006;
U.S. application Ser. No. 11/536,645, filed Sep. 29, 2006;
U.S. application Ser. No. 11/536,655, filed Sep. 29, 2006;
U.S. application Ser. No. 11/536,660, filed Sep. 29, 2006;
U.S. application Ser. No. 11/536,657, filed Sep. 29, 2006;
U.S. application Ser. No. 11/536,662, filed Sep. 29, 2006;
U.S. application Ser. No. 11/536,688, filed Sep. 29, 2006;
U.S. application Ser. No. 11/536,667, filed Sep. 29, 2006;
U.S. application Ser. No. 11/536,651, filed Sep. 29, 2006;
U.S. application Ser. No. 11/536,656, filed Sep. 29, 2006; and
U.S. application Ser. No. 11/536,663, filed Sep. 29, 2006.

The above stated applications are hereby incorporated herein by reference in their entirety.

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to wireless communication systems. More specifically, certain embodiments of the invention relate to a method and system for communicating information in a multi-antenna system

BACKGROUND OF THE INVENTION

Communication systems may support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, may communicate directly or indirectly with other wireless communication devices. For direct communications, the participating wireless communication devices may tune their receivers and transmitters to the same channel or channels, for example, one of a plurality of radio frequency (RF) carriers of the wireless communication system and communicate over those channels. For indirect wireless communications, each wireless communication device may communicate directly with an associated base station and/or an associated access point via an assigned channel. To complete a communication connection between the wireless communication devices, the associated base stations and/or associated access points may communicate with each other directly, via a system controller, via a public switched telephone network (PSTN), via the Internet, and/or via some other wide area network.

The utilization of multiple transmit and/or receive antennas is designed to introduce a diversity gain and array gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M-1) interferers. Accordingly, N signals may be simultaneously transmitted in the same bandwidth using N transmit antennas, with the transmitted signal then being separated into N respective signals by way of a set of N antennas deployed at the receiver. Systems that utilize multiple transmit and multiple receive antenna may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR).

In conventional systems, additional functionality may require the use of additional circuitry. This additional circuitry may generally requires a much larger die area and results in increased power consumption. For mobile applications in particular, the increased power consumption is undesirable due to limited battery capacity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for communicating information in a multi-antenna system, substantially as shown in and/or described in connection with at least one of the figures, as set forth more completely in the claims.

These and other advantages, aspects and novel features of the present invention, as well as details of an illustrated embodiment thereof will be more fully understood from the following description and drawings.

DETAILED DESCRIPTION OF THE INVENTION

Certain embodiments of the invention may be found in a method and system for communicating information in a multi-antenna system. Certain aspects of the invention may comprise receiving at least one narrowband RF signal via at least one of a plurality of receiving antennas that is unused within a wideband diversity radio frequency (RF) receiver comprising a plurality of receiving antennas, when the wideband diversity RF receiver is operating in a narrowband receiving mode.

Figure 1:
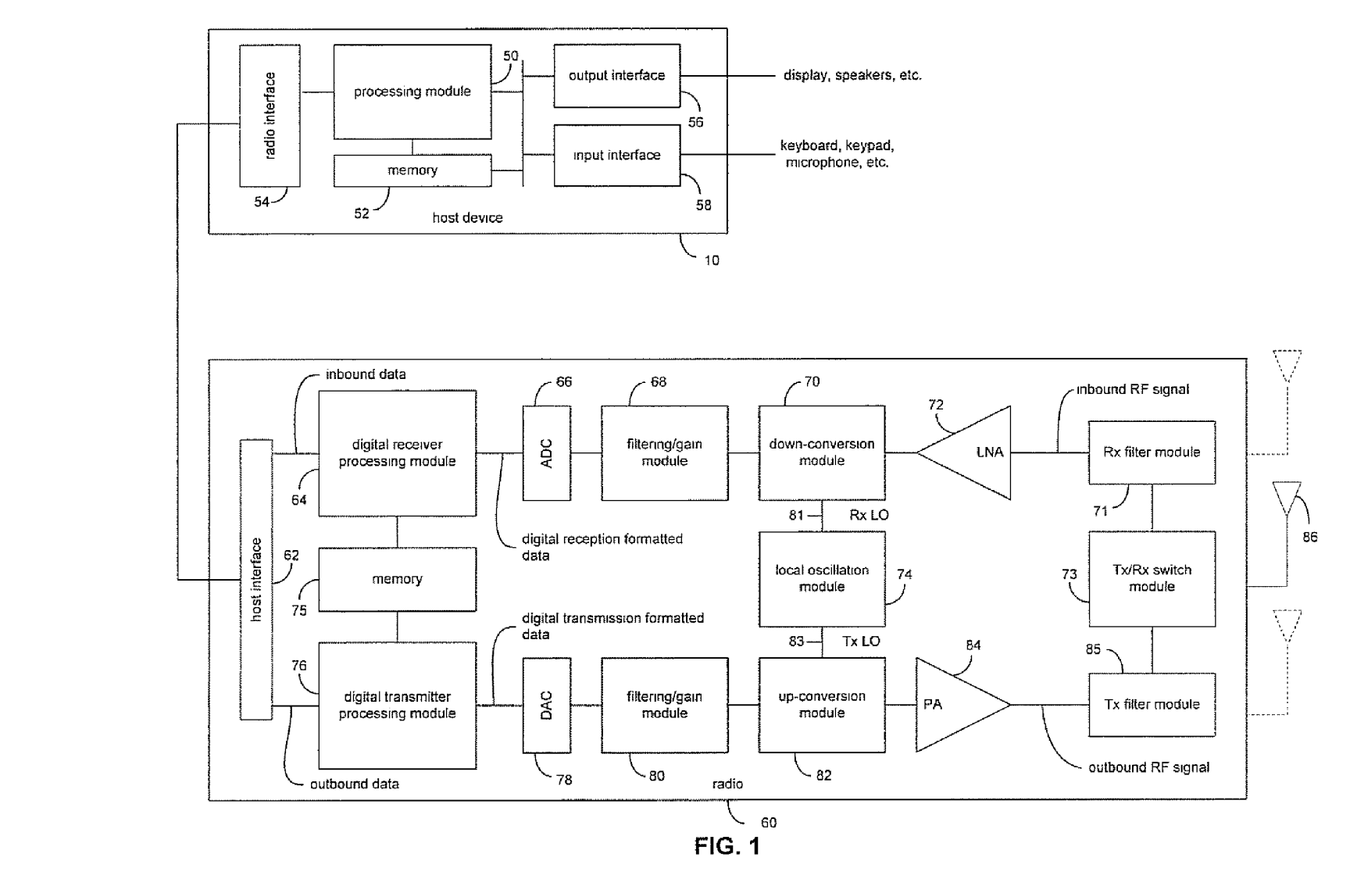
FIG. 1 is a block diagram illustrating a wireless communication host device and an associated radio, in accordance with an embodiment of the invention.

FIG. 1 is a block diagram illustrating a wireless communication host device and an associated radio, in accordance with an embodiment of the invention. Referring to FIG. 1, there is shown a wireless communication host device 10 and an associated radio 60.

The wireless communication host device 10 may comprise a processing module 50, a memory 52, a radio interface 54, an input interface 58 and an output interface 56. The processing module 50 and the memory 52 may be enabled to execute a plurality of instructions. For example, for a cellular telephone host device, the processing module 50 may be enabled to perform the corresponding communication functions in accordance with a particular cellular telephone standard.

The radio interface 54 may be enabled to allow data to be received from and transmitted to the radio 60. The radio interface 54 may be enabled to provide the data received from the radio 60 to the processing module 50 for further processing and/or routing to the output interface 56. The output interface 56 may be enabled to provide connectivity to an output device such as a display, monitor, or speakers such that the received data may be displayed. The radio interface 54 may be enabled to provide data from the processing module 50 to the radio 60. The processing module 50 may be enabled to receive the outbound data from an input device such as a keyboard, keypad, or microphone via the input interface 58 or generate the data itself. The processing module 50 may be enabled to perform a corresponding host function on the data received via input interface 58 and/or route it to radio 60 via radio interface 54.

For cellular telephone hosts, radio 60 may be a built-in component. For personal digital assistants hosts, laptop hosts, and/or personal computer hosts, the radio 60 may be built-in or an externally coupled component. The radio 60 may comprise a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 may be shared by the transmit and receive paths as regulated by the Tx/Rx switch module 73.

The digital receiver processing module 64 and the digital transmitter processing module 76, in combination with operational instructions stored in the memory 75, may be enabled to execute digital receiver functions and digital transmitter functions, respectively. The digital receiver functions may comprise, but are not limited to, demodulation, constellation demapping, decoding, and/or descrambling. The digital transmitter functions may comprise, but are not limited to, scrambling, encoding, constellation mapping, and modulation. The digital receiver and the transmitter processing modules 64 and 76, respectively, may be implemented using a shared processing device, individual processing devices, or a plurality of processing devices, for example, a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The memory 75 may be a single memory device or a plurality of memory devices. For example, the memory 75 may be a read-only memory, random access memory, volatile memory, non-volatile memory, static memory, dynamic memory, flash memory, and/or any device that stores digital information. When the digital receiver processing module 64 and/or the digital transmitter processing module 76 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. The memory 75 may be enabled to store, and digital receiver processing module 64 and/or digital transmitter processing module 76 may be enabled to execute, operational instructions corresponding to at least some of the functions illustrated herein.

In operation, the radio 60 may be enabled to receive outbound data from the wireless communication host device 10 via host interface 62. The host interface 62 may be enabled to route outbound data to the digital transmitter processing module 76. The digital transmitter processing module 76 may be enabled to process the outbound data in accordance with a particular wireless communication standard or protocol, for example, IEEE 802.11a, IEEE 802.11b, and Bluetooth to produce digital transmission formatted data. The digital transmission formatted data may be a digital baseband signal or a digital low IF signal, where the low IF may be in the frequency range of one hundred kilohertz to a few megahertz, for example.

The digital-to-analog converter 78 may be enabled to convert the digital transmission formatted data from the digital domain to the analog domain. The filtering/gain module 80 may be enabled to filter and/or adjusts the gain of the analog baseband signal prior to providing it to the up-conversion module 82. The up-conversion module 82 may be enabled to directly convert the analog baseband signal, or low IF signal, into an RF signal based on a transmitter local oscillation 83 provided by the local oscillation module 74. The power amplifier 84 may enable amplification of the RF signal to produce an outbound RF signal, which may be filtered by the transmitter filter module 85. The antenna 86 may be enabled to transmit the outbound RF signal to a targeted device such as a base station, an access point and/or another wireless communication device.

The radio 60 may be enabled to receive an inbound RF signal via antenna 86, which was transmitted by a base station, an access point, or another wireless communication device. The antenna 86 may be enabled to communicate the inbound RF signal to the receiver filter module 71 via Tx/Rx switch module 73, where Rx filter module 71 bandpass filters inbound RF signal. The Rx filter module 71 may be enabled to communicate the filtered RF signal to the low noise amplifier 72, which may amplify the inbound RF signal to generate an amplified inbound RF signal. The low noise amplifier 72 may be enabled to communicate the amplified inbound RF signal to the down-conversion module 70, which may directly convert the amplified inbound RF signal into an inbound low IF signal or baseband signal based on a receiver local oscillation 81 provided by local oscillation module 74. The down-conversion module 70 may be enabled to communicate the inbound low IF signal or baseband signal to the filtering/gain module 68. The filtering/gain module 68 may be enabled to filter and/or attenuate the inbound low IF signal or the inbound baseband signal to produce a filtered inbound signal.

The analog-to-digital converter 66 may be enabled to convert the filtered inbound signal from the analog domain to the digital domain to generate digital reception formatted data. The digital receiver processing module 64 may be enabled to decode, descramble, demap, and/or demodulate digital reception formatted data to recapture inbound data. The host interface 62 may be enabled to communicate the recaptured inbound data to the wireless communication host device 10 via the radio interface 54.

The local oscillation module 74 may be enabled to adjust an output frequency of a received local oscillation signal. The local oscillation module 74 may be enabled to receive a frequency correction input to adjust an output local oscillation signal to generate a frequency corrected local oscillation signal output.

Figure 2:
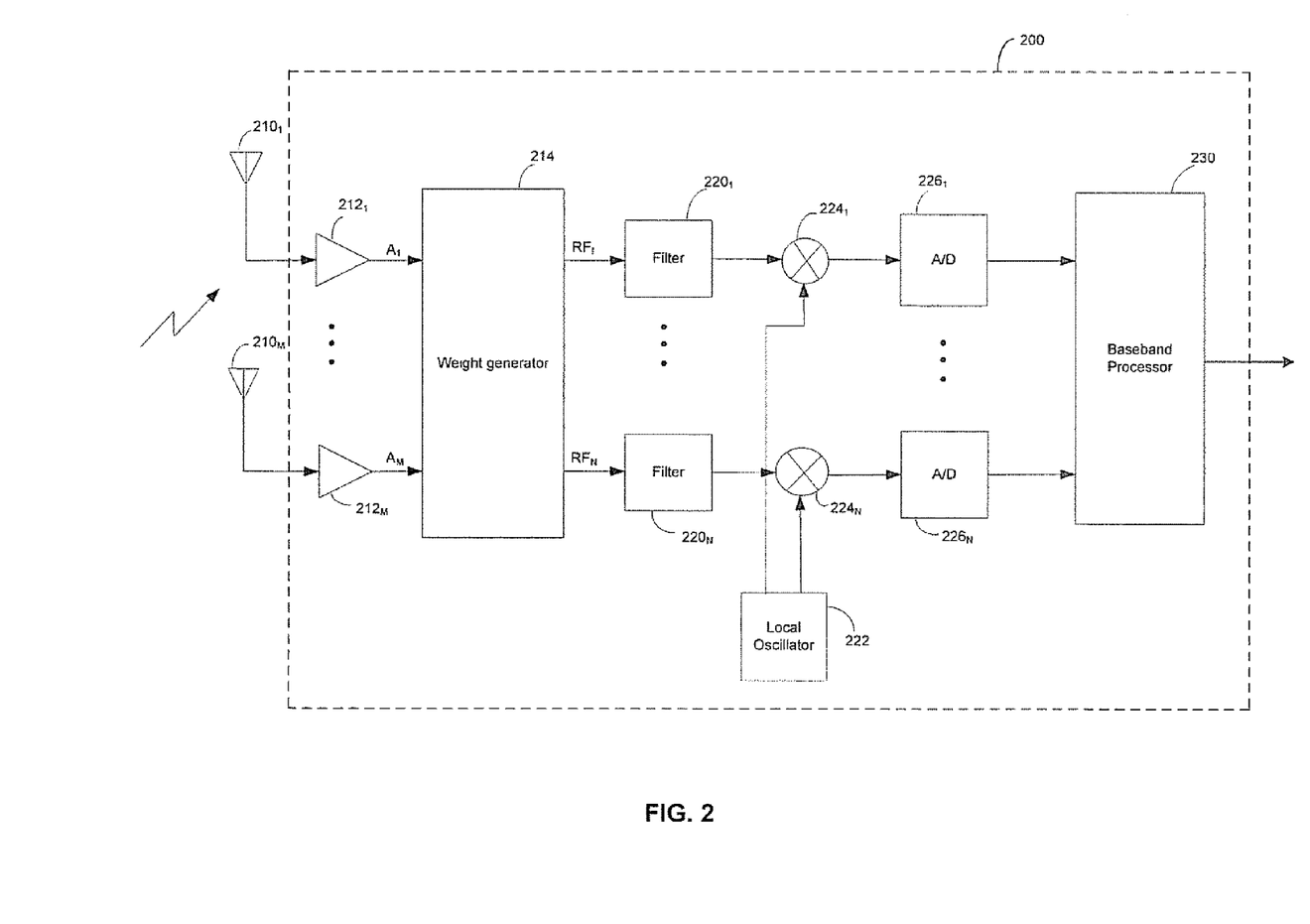
FIG. 2 is a block diagram of an exemplary wideband diversity radio frequency (RF) receiver, in accordance with an embodiment of the invention.

FIG. 2 is a block diagram of an exemplary wideband diversity radio frequency (RF) receiver, in accordance with an embodiment of the invention. Referring to FIG. 2, there is shown a wideband diversity RF receiver 200. The wideband diversity RF receiver 200 may comprise a plurality of receive antennas $210_{1,2,\ldots M}$, a plurality of amplifiers $212_{1,2,\ldots M}$, a weight generation block 214, a plurality of filters $220_{1,2,\ldots N}$, a local oscillator 222, a plurality of mixers $224_{1,2,\ldots N}$, a plurality of analog to digital (A/D) converters $226_{1,2,\ldots N}$ and a baseband processor 230.

The antennas $210_{1,2,\ldots M}$ may be enabled to receive the RF communication signals. The amplifiers $212_{1,2,\ldots M}$ may be enabled to amplify the M received input RF signals. The weight generation block 214 may comprise a plurality of amplitude and phase shifters to compensate for the phase difference between various received input RF signals. Weights may be applied to each of the input signals $A_{1\ldots M}$ to modify the phase and amplitude of a portion of the transmitted signals received by the plurality of receive antennas $212_1$ $_M$ and generate a plurality of output signals $RF_{1\ldots N}$. The plurality of filters $220_{1,2,\ldots N}$ may be enabled to filter frequency components of the RF substreams. The mixers $224_{1,2,\ldots N}$ may be enabled to downconvert the analog RF substreams to baseband. The local oscillator 222 may be enabled to provide a signal to the mixers $224_{1,2,\ldots N}$, which may be utilized to downconvert the analog RF substreams to baseband. The analog to digital (A/D) converters $226_{1,2,\ldots N}$ may be enabled to convert the analog baseband substreams into their corresponding digital substreams. The baseband processor 230 may be enabled to process the digital baseband substreams and multiplex the plurality of digital signals to generate output signals.

In operation, the RF signals may be received by a plurality of M receive antennas $210_{1,2,\ldots M}$ at the receiver 200. Each of the M received signals may be amplified by a respective low noise amplifier $212_{1,2,\ldots M}$. A plurality of weights may be applied to each of the input signals $A_{1\ldots M}$ to modify the phase and amplitude of a portion of the transmitted signals received by the plurality of receive antennas $212_{1\ldots M}$. A plurality of output signals $RF_{1\ldots N}$ may be generated, which may be filtered by a plurality of filters $220_{1,2,\ldots N}$. The resulting N filtered signals may then be downconverted to baseband utilizing a plurality of N mixers $224_{1,2,\ldots N}$, each of which may be provided with a carrier signal that may be generated by a local oscillator 222. The N baseband signals generated by the mixers $224_{1,2,\ldots N}$ may then be converted to digital signals by a plurality of analog to digital (A/D) converters $226_{1,2,\ldots N}$. The N digital signals may further be processed by a baseband processor 230 to generate the output signals.

In one embodiment of the invention, the baseband processor 230 may be operating in accordance with one or more standards, including but not limited to, IEEE 802.11, Bluetooth, advanced mobile phone services (AMPS), global systems for mobile communications (GSM), code division multiple access (CDMA), local multi-point distribution systems (LMDS), digital video broadcasting handheld (DVB-H), multi-channel-multi-point distribution systems (MMDS), global positioning system (GPS), frequency modulation (FM), enhanced data rates for GSM evolution (EDGE) and/or variations thereof.

The wideband diversity RF receiver 200 may comprise a plurality of receiving antennas $210_{1,2,\ldots M}$ for diversity processing of wideband RF signals when operating in a wideband mode, for example, W-CDMA. When the wideband diversity RF receiver 200 is operating in a narrowband mode, at least a portion of a plurality of antennas may be unused. For example, antennas $210_{3\ldots M}$ may be unused in a narrowband mode of operation. The wideband mode of operation may be for a bandwidth greater than 1 MHz, for example. The narrowband mode of operation may be for a bandwidth less than 300 kHz, for example, wherein the fading across the channel may be almost flat.

In accordance with an embodiment of the invention, when operating in a narrowband mode, at least one of the unused antennas, for example, antenna $210_{3\ldots M}$ may be enabled to receive any combination of data signals such as GPS, EDGE, GSM, FM, DVB-H and/or variations thereof.

Figure 3A:
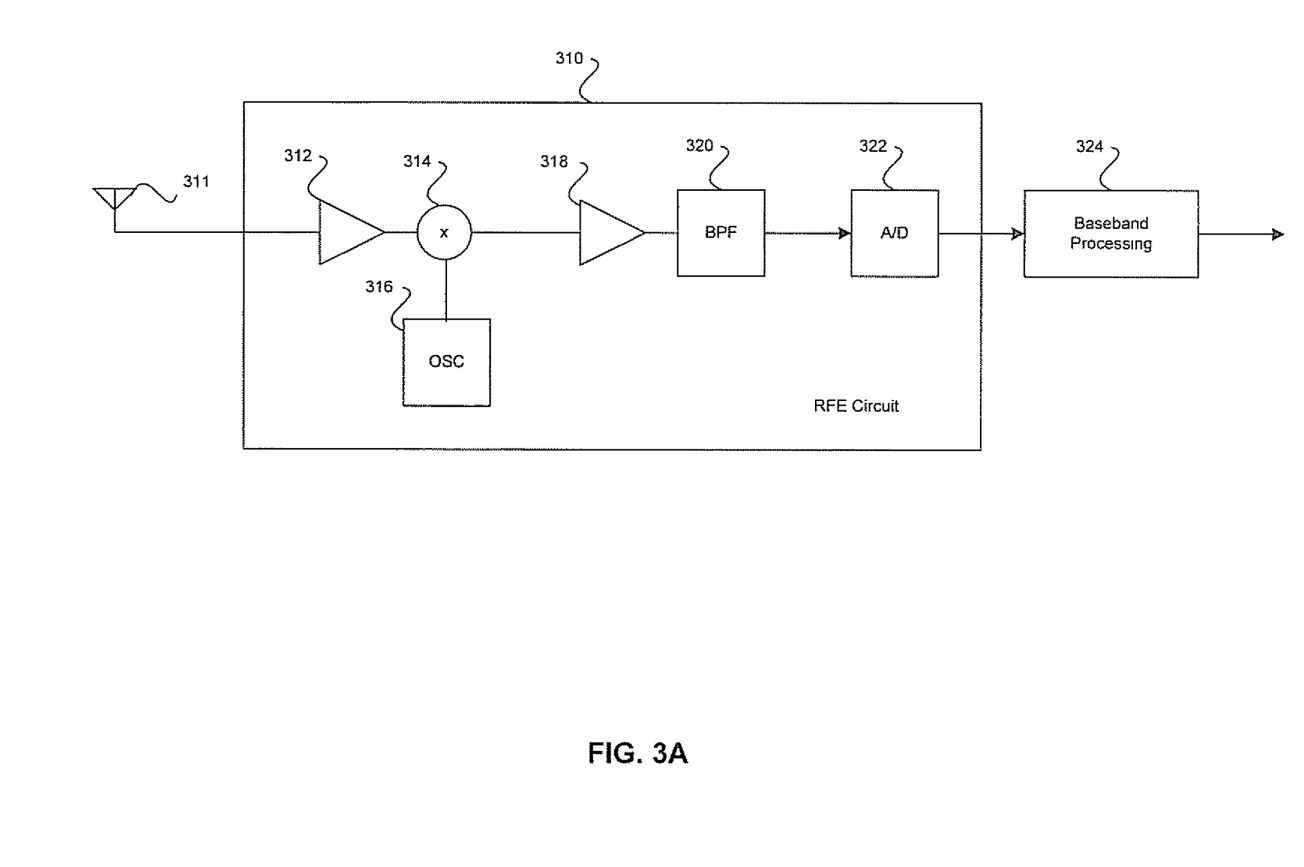
FIG. 3A is a block diagram of a wideband diversity radio frequency (RF) receiver operating in a narrowband mode of operation, in accordance with an embodiment of the invention.

FIG. 3A is a block diagram of a wideband diversity radio frequency (RF) receiver operating in a narrowband mode of operation, in accordance with an embodiment of the invention. Referring to FIG. 3A, there is shown a portion of the wideband diversity RF receiver 200 operating in a narrowband mode of operation. The portion of the wideband diversity RF receiver 200 may comprise an unused antenna 311, receiver front end (RFE) circuit 310, and baseband processing block 324. The receiver front end (RFE) circuit 310 may comprise a low noise amplifier (LNA) 312, a mixer 314, an oscillator 316, a low noise amplifier or amplifier or amplifier 318, a bandpass filter 320 and an analog-to-digital converter (A/D) 322.

The unused antenna 311 in a narrowband mode of operation may be enabled to receive at least one of a plurality of data signals. For example, the antenna 311 may be enabled to receive any combination of a plurality of data signals in the GSM band, W-CDMA, VHF/UHF band, GPS, EDGE, FM, DVB-H and/or variations thereof. The receiver front end (RFE) circuit 310 may comprise suitable circuitry, logic and/or code that may be enabled to convert a received REF signal down to baseband. An input of the low noise amplifier 312 may be coupled to the antenna 311 so that it may receive RF signals from the antenna 311. The low noise amplifier 312 may comprise suitable logic, circuitry, and/or code that may be enabled to receive an input RF signal from the antenna 311 and amplify the received RF signal in such a manner that an output signal generated by the low noise amplifier 312 has low additional noise.

The mixer 314 in the RFE circuit 310 may comprise suitable circuitry and/or logic that may be enabled to mix an output of the low noise amplifier 312 with an oscillator signal generated by the oscillator 316. The oscillator 316 may comprise suitable circuitry and/or logic that may be enabled to provide a oscillating signal that may be enabled to mix the output signal generated from the output of the low noise amplifier 312 down to a baseband. The low noise amplifier (LNA) or amplifier 318 may comprise suitable circuitry and/or logic that may be enabled to low noise amplify and output signal generated by the mixer 314. An output of the low noise amplifier or amplifier 318 may be communicated to the transmit path bandpass filter 320. The bandpass filter 320 may comprise suitable logic, circuitry and/or code that may be enabled to bandpass filter the output signal generated from the output of the low noise amplifier 320. The bandpass filter block 320 may be enabled to retain a desired signal and filter out unwanted signal components such as higher signal components comprising noise. An output of the bandpass filter 320 may be communicated to the analog-digital-converter for processing.

The analog-to-digital converter (A/D) 322 may comprise suitable logic, circuitry and/or code that may be enabled to convert the analog signal generated from the output of the transmit path bandpass filter 320 to a digital signal. The analog-to-digital converter 322 may generate a sampled digital representation of the bandpass filtered signal that may be communicated to the baseband-processing block 324 for processing. The baseband processing block 324 may comprise suitable logic, circuitry and/or code that may be enabled to process digital baseband signals received form an output of the A/D 322. Although the A/D 322 is illustrated as part of the RFE circuit 310, the invention may not be so limited. Accordingly, the A/D 322 may be integrated as part of the baseband processing block 324. In operation, the RFE circuit 310 may be enabled to receive RF signals via antenna 311 and convert the received RF signals to a sampled digital representation, which may be communicated to the baseband processing block 324 for processing.

Figure 3B:
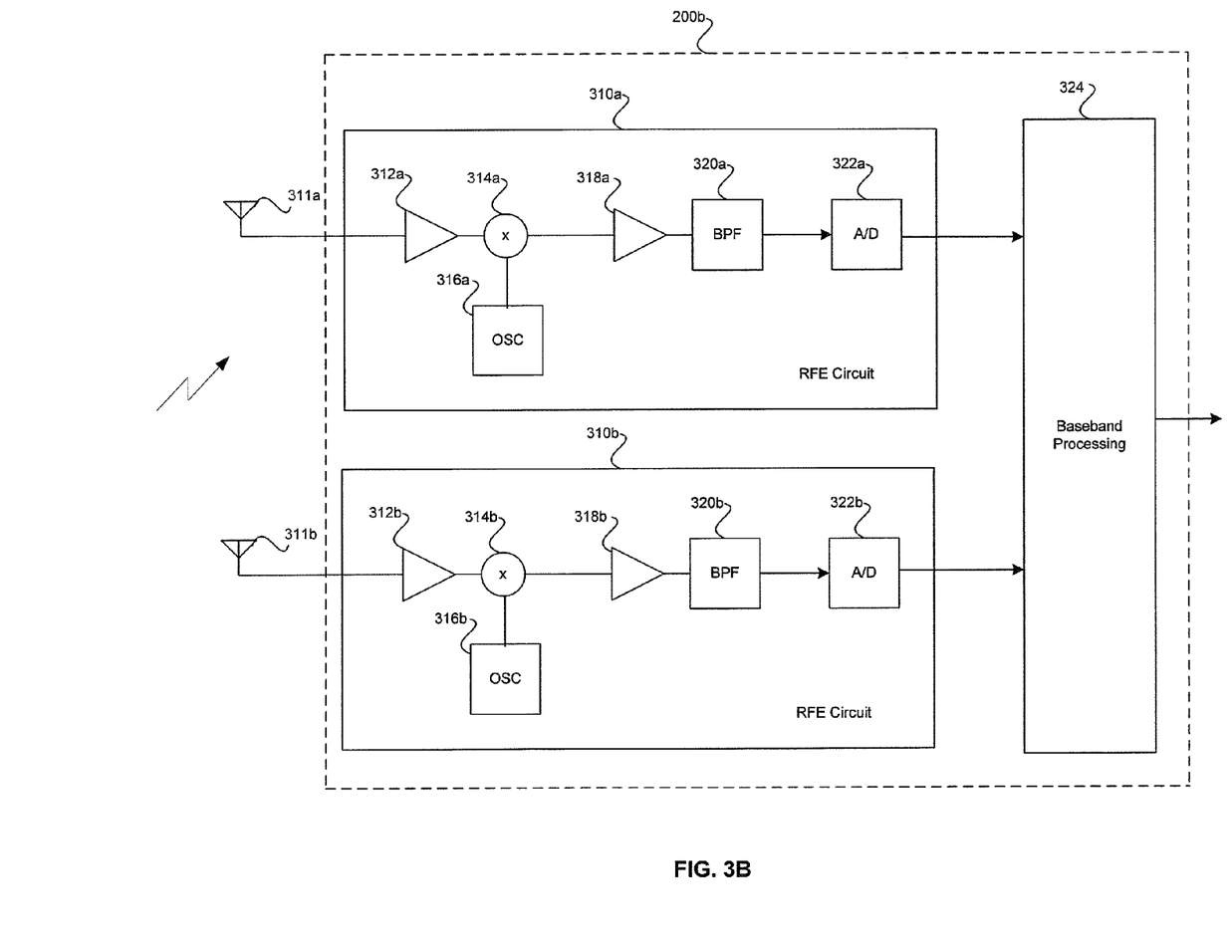
FIG. 3B is a block diagram of an exemplary system for communicating information with two diversity antennas, in accordance with an embodiment of the invention.

FIG. 3B is a block diagram of an exemplary system for communicating information with two diversity antennas, in accordance with an embodiment of the invention. Referring to FIG. 3B, there is shown the wideband diversity radio frequency (RF) receiver 200b operating in a 3G mode of operation. The wideband diversity RF receiver 200b may comprise a pair of antennas, 311a and 311b, a pair of receiver front end (RFE) circuits, 310a and 310b, and a baseband processing block 324. The RFE circuit 310a may comprise a low noise amplifier (LNA) 312a, a mixer 314a, an oscillator 316a, a low noise amplifier 318a, a bandpass filter 320a and an analog-to-digital converter (A/D) 322a. The RFE circuit 310b may comprise a low noise amplifier (LNA) 312b, a mixer 314b, an oscillator 316b, a low noise amplifier 318b, a bandpass filter 320b and an analog-to-digital converter (A/D) 322b. The blocks and components in FIG. 3B may be substantially as described in FIG. 3A.

The wideband diversity RF receiver 200b operating in a 3G mode may be enabled to operate in at least one of: a wideband code division multiple access (W-CDMA), time division CDMA (TD/CDMA), and CDMA2000 mode. For example, when operating in a W-CDMA mode, the wideband diversity RF receiver 200b may be enabled to utilize a wide RF channel, efficient coding, and multiple channels to provide for both low-speed circuit and high-speed packet services. The wideband diversity RF receiver 200 may utilize direct sequence code multiple access (DS_CDMA) technology, QPSK modulation, paired frequency division duplex (FDD) RF channels, and variable bandwidth control. The wideband diversity RF receiver 200 may enable multiple physical channels to co-exist in the same frequency band by utilizing a plurality of spreading codes. The spreading codes may be chosen to be orthogonal with each other.

When the wideband diversity RF receiver 200b is operating in a narrowband mode, the antenna 311b may be unused. The unused antenna 311b may be enabled to receive any combination of data signals such as GPS, EDGE, GSM, FM, DVB-H and/or variations thereof.

Figure 3C:
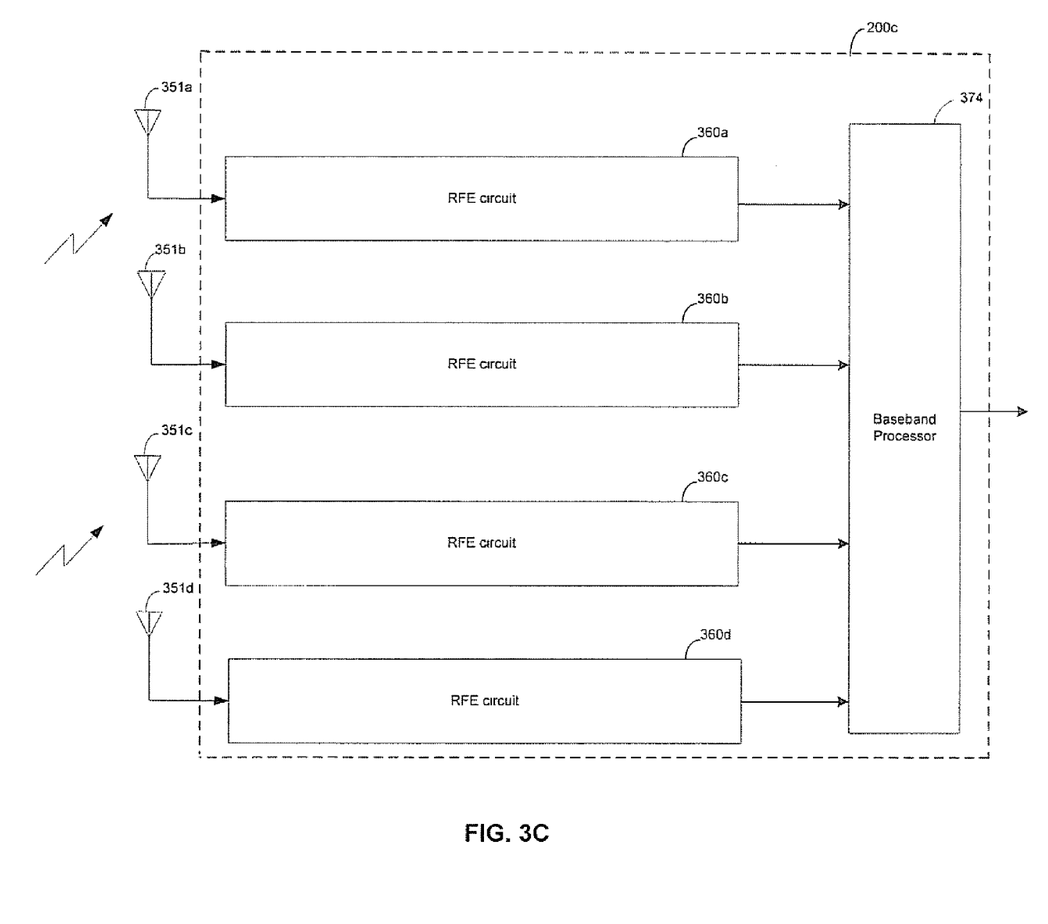
FIG. 3C is a block diagram of an exemplary system for communicating information with four diversity antennas, in accordance with an embodiment of the invention.

FIG. 3C is a block diagram of an exemplary system for communicating information with four diversity antennas, in accordance with an embodiment of the invention. Referring to FIG. 3C, there is shown the wideband diversity radio frequency (RF) receiver 200c operating in a 4G mode of operation. The wideband diversity RF receiver 200c may comprise a plurality of antennas 351a, 351b, 351c, and 351d, a plurality of receiver front end (RFE) circuits 360a, 360b, 360c, and 360d, and a baseband processing block 374. Each of the RFE circuits 360a, 360b, 360c, and 360d may comprise a low noise amplifier (LNA) 312, a mixer 314, an oscillator 316 a low noise amplifier 318, a bandpass filter 320 and an analog-to-digital converter (A/D) 322 as illustrated in FIG. 3A. The blocks and components in FIG. 3C may be substantially as described in FIG. 3A.

The wideband diversity RF receiver 200c operating in a 4G mode may be enabled to utilize multicarrier modulation (MCM), a derivative of frequency-division multiplexing to transmit information by utilizing parallel equal bandwidth sub-channels. The wideband diversity RF receiver 200c may either utilize multicarrier code division multiple access (MC-CDMA) or orthogonal frequency division multiplexing (OFDM) with TDMA to achieve multicarrier modulation. The received signals may be multiplexed with orthogonal codes to distinguish users in MC-CDMA. In OFDM with TDMA, the users may be allocated time intervals to transmit and receive data.

In operation, the RF signals may be received via the plurality of antennas 351a, 351b, 351c, and 351d. The received RF signals may be processed by the corresponding RFE circuits 360a, 360b, 360c, and 360d. Each of the RFE circuits 360a, 360b, 360c, and 360d may be enabled to amplify the received RF signals, downconvert the received RF signals to IF signals for baseband processing, filter the IF signals, and convert the filtered IF signals to digital signals. The baseband processing block may be implemented with a plurality of ICs, including digital signal processors (DSPs), microcontrollers, and ASICs, for example. The wideband diversity RF receiver 200c may also comprise machine readable software, and/or algorithms for coding, and processing of the received signals.

The wideband diversity RF receiver 200c operating in 4G mode may utilize a form of concatenated coding, for example, turbo codes, or a combination of a block code and a convolutional code. A smart antenna may be utilized to improve the received signal by adjusting the beam pattern of the antennas. For example, a switched-beam antenna or an adaptive array antenna may be utilized. The switched-beam antenna may be enabled to select a beam pattern from a set of predetermined patterns. The adaptive array antenna may be enabled to dynamically steer narrow beams toward multiple users.

When the wideband diversity RF receiver 200c is operating in a narrowband mode, a plurality of antennas may be unused. For example, antennas 351b, 351c, and 351d may be unused during a narrowband mode of operation. In accordance with an embodiment of the invention, the plurality of unused antennas 351b, 351c, and 351d may be enabled to receive any combination of data signals such as GPS, EDGE, GSM, FM, DVB-H and/or variations thereof.

Figure 4:
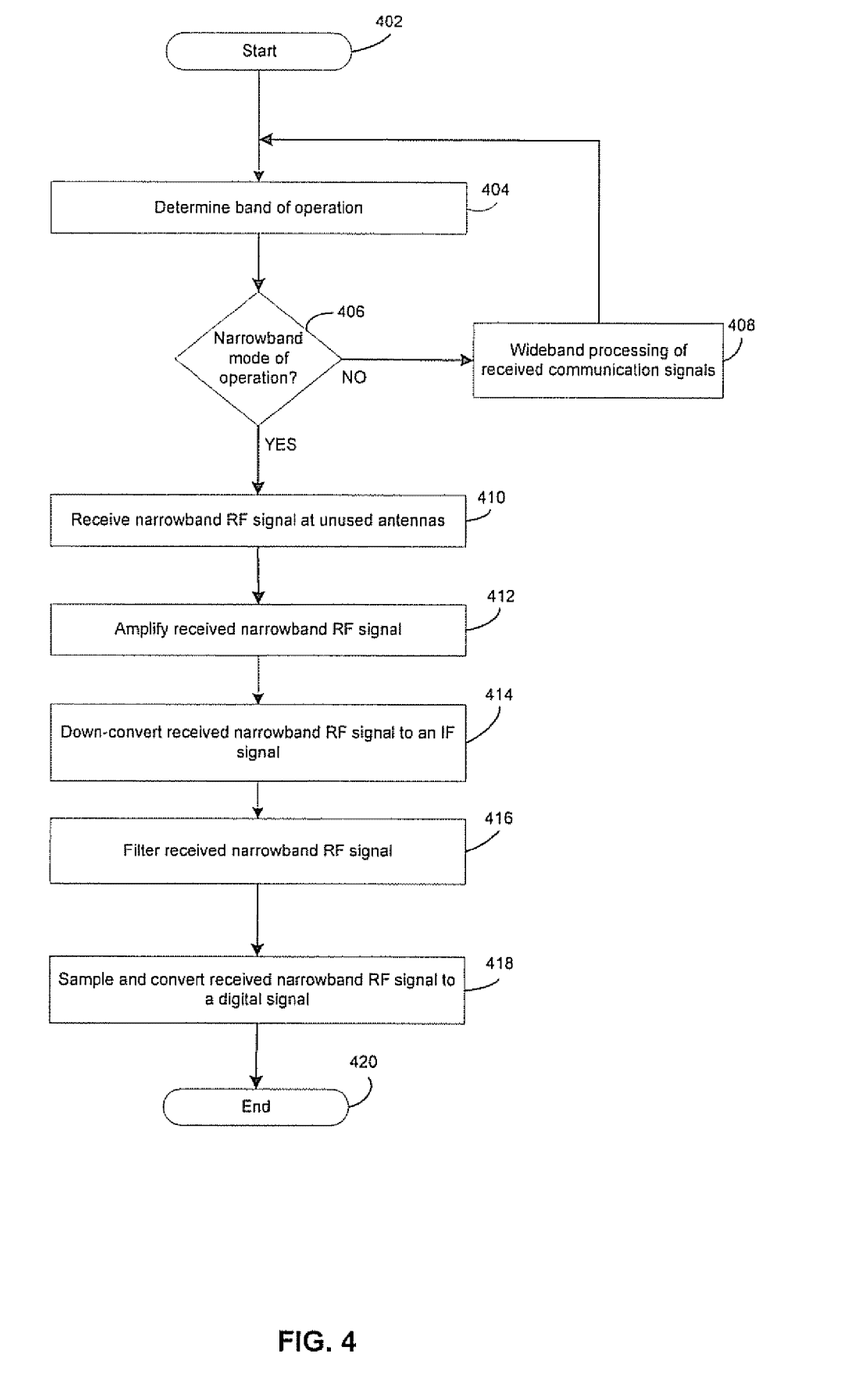
FIG. 4 is a flowchart illustrating exemplary steps for communicating information in a multi-antenna system, in accordance with an embodiment of the invention.

FIG. 4 is a flowchart illustrating exemplary steps for communicating information in a multi-antenna system, in accordance with an embodiment of the invention. Referring to FIG. 4, exemplary steps may begin at step 402. In step 404, the band of operation of the wideband diversity RF receiver 200 may be determined. The wideband diversity RF receiver 200 may be operating in wideband mode, for example, W-CDMA or in narrowband mode, for example, global system for mobile communications (GSM) or enhanced data rates for GSM evolution (EDGE). In step 406, it may be determined whether the wideband diversity RF receiver 200 is operating in a narrowband mode of operation. If the wideband diversity RF receiver 200 is not operating in a narrowband mode of operation, control passes to step 408. In step 408, wideband processing of the received RF signals may be performed. Control then returns to step 404.

If the wideband diversity RE receiver 200 is operating in a narrowband mode of operation, control passes to step 410. In step 410, at least one narrowband RF signal may be received via at least one of the unused antennas. In step 412, the received narrowband RF signal may be amplified. In step 414, the received narrowband RF signal may be down-converted to an intermediate frequency (IF) signal. In step 416, the received narrowband RF signal may be filtered. In step 418, the received narrowband RF signal may be sampled and converted to a digital signal. Control then passes to end step 420.

In accordance with an embodiment of the invention, a method and system for communicating information in a multi-antenna system may comprise a wideband diversity RF receiver 200 that may comprise a plurality of receiving antennas $210_{1\ M}$ for diversity processing of wideband RF signals when operating in a wideband mode, for example, W-CDMA. When the wideband diversity RF receiver 200 is operating in a narrowband mode, at least a portion of a plurality of antennas may be unused, for example, $210_{3\ M}$. For example, antenna 311 may be unused in a narrowband mode of operation.

When operating in a narrowband mode, at least one of the unused antennas, for example, antenna 311 may be enabled to receive a narrowband REF signal, for example, a GPS, EDGE, GSM, FM, DVB-H and/or variations thereof. The LNA 312 may be enabled to amplify the received narrowband REF signal. The BPF 320 may be enabled to filter the received narrowband RF signal. The analog-to-digital converter (A/D) 322 may be enabled to convert the received narrowband RF signal to a digital signal. The analog-to-digital converter (A/D) 322 may be enabled to sample the received narrowband RF signal. The mixer 314 may be enabled to down-convert the received narrowband RF signal to an intermediate frequency (IF) signal.

Another embodiment of the invention may provide a machine-readable storage, having stored thereon, a computer program having at least one code section executable by a machine, thereby causing the machine to perform the steps as described above for communicating information in a multi-antenna system. For example, any one or more of the components in the wireless communication host device 10 and/or the radio 60 may be controlled via code such as software and/or firmware. In this regard, in an exemplary embodiment of the invention, any one or more of the digital receiver processing module 64, ADC 66, filtering/gain module 68, down-conversion module 70, LNA 72 and Rx filter module 71 may be programmably controlled by code comprising software and/or firmware. In another exemplary embodiment of the invention, any one or more of the digital transmitter processing module 76, DAC 78, filtering/gain module 80, up-conversion module 82, PA 84, and Tx filter module 86, may be programmably controlled by code comprising software and/or firmware.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for use by a device including a wideband diversity radio frequency (RF) receiver comprising a plurality of antennas having a first antenna and a second antenna, the method comprising:
configuring said device to operate in a wideband mode;
receiving, when said device is operating in said wideband mode, a wideband RF signal using said plurality of antennas, including said first antenna and said second antenna;

configuring said device to operate in a narrowband mode after said receiving, of said wideband RF signal using said first antenna and said second antenna;

receiving, when said device is operating in said narrowband mode, at least one narrowband RF signal using said first antenna, which was used for said receiving of said wideband RF signal; and receiving, when said device is operating in said narrowband mode, at least one data signal using said second antenna, which was used for said receiving of said wideband RF signal.

2. The method according to claim 1, comprising amplifying said received at least one narrowband RF signal.

3. The method according to claim 1, wherein said received at least one data signal is one or more of: a global systems for mobile communications (GSM) signal, digital video broadcasting handheld (DVB-H) signal, global positioning system (GPS) signal, frequency modulation (FM) signal, and/or an enhanced data rates for GSM evolution (EDGE) signal.

4. The method according to claim 1, comprising filtering said received at least one narrowband RF signal.

5. The method according to claim 1, comprising converting said received at least one narrowband RF signal to a digital signal.

6. The method according to claim 1, comprising sampling said received at least one narrowband RF signal.

7. The method according to claim 1, comprising downconverting said received at least one narrowband RF signal to an intermediate frequency (IF) signal.

8. A non-transitory machine-readable storage having stored thereon, a computer program having at least one code section for use by a device including a wideband diversity radio frequency (RF) receiver comprising a plurality of antennas having a first antenna and a second antenna, the at least one code section being executable by a machine for causing the machine to perform:

configuring said device to operate in a wideband mode;

receiving, when said device is operating in said wideband mode, a wideband RF signal using said plurality of antennas, including said first antenna and said second antenna;

configuring said device to operate in a narrowband mode after said receiving of said wideband RF signal using said first antenna and said second antenna;

receiving, when said device is operating in said narrowband mode, at least one narrowband RF signal using said first antenna, which was used for said receiving of said wideband RF signal; and receiving, when said device is operating in said narrowband mode, at least one data signal using said second antenna, which was used for said receiving of said wideband RF signal.

9. The non-transitory machine-readable storage according to claim 8, wherein said at least one code section comprises code for amplifying said received at least one narrowband RF signal.

10. The non-transitory machine-readable storage according to claim 8, wherein said received at least one data signal is one or more of a global systems for mobile communications (GSM) signal, digital video broadcasting handheld (DVB-H) signal, global positioning system (GPS) signal, frequency modulation (FM) signal, and/or an enhanced data rates for GSM evolution (EDGE) signal.

11. The non-transitory machine-readable storage according to claim 8, wherein said at least one code section comprises code for filtering said received at least one narrowband RF signal.

12. The non-transitory machine-readable storage according to claim 8, wherein said at least one code section comprises code for converting said received at least one narrowband RF signal to a digital signal.

13. The non-transitory machine-readable storage according to claim 8, wherein said at least one code section comprises code for sampling said received at least one narrowband RF signal.

14. The non-transitory machine-readable storage according to claim 8, wherein said at least one code section comprises code for downconverting said received at least one narrowband RF signal to an intermediate frequency (IF) signal.

15. A device comprising:
one or more circuits within a wideband diversity radio frequency (RF) receiver comprising a plurality of antennas having a first antenna and a second antenna, said one or more circuits being operable to:
configure said device to operate in a wideband mode;
receive, when said device is operating in said wideband mode, a wideband RF signal using said plurality of antennas, including said first antenna and said second antenna;
configure said device to operate in a narrowband mode after receiving said wideband RF signal using said first antenna and said second antenna;
receive, when said device is operating in said narrowband mode, at least one narrowband RF signal using said first antenna, which was used for said receiving of said wideband RF signal; and
receive, when said device is operating in said narrowband mode, at least one data signal using said second antenna, which was used for said receiving of said wideband RF signal.

16. The device according to claim 15, wherein said one or more circuits is operable to amplify said received at least one narrowband RF signal.

17. The device according to claim 15, wherein said received at least one data signal is one or more of: a global systems for mobile communications (GSM) signal, digital video broadcasting handheld (DVB-H) signal, global positioning system (GPS) signal, frequency modulation (FM) signal, and/or an enhanced data rates for GSM evolution (EDGE) signal.

18. The device according to claim 15, wherein said one or more circuits is operable to filter said received at least one narrowband RF signal.

19. The device according to claim 15, wherein said one or more circuits is operable to convert said received at least one narrowband RF signal to a digital signal.

20. The device according to claim 15, wherein said one or more circuits is operable to sample said received at least one narrowband RF signal.

21. The device according to claim 15, wherein said one or more circuits is operable to down-convert said received at least one narrowband RF signal to an intermediate frequency (IF) signal.

* * * * *